United States Patent
Mateo et al.

(10) Patent No.: US 9,528,378 B2
(45) Date of Patent: Dec. 27, 2016

(54) COMPOSITE TURBOMACHINE BLADE WITH IN-BUILT ROOT

(75) Inventors: Julien Mateo, Carignan de Bordeaux (FR); Clément Roussille, Bordeaux (FR); David Marsal, Saint Aubin de Medoc (FR); Gilles Ansorena, Saint Aubin de Medoc (FR); Ivan Herraiz, Pau (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 519 days.

(21) Appl. No.: 14/117,382

(22) PCT Filed: May 11, 2012

(86) PCT No.: PCT/FR2012/051047
§ 371 (c)(1),
(2), (4) Date: Nov. 13, 2013

(87) PCT Pub. No.: WO2012/156625
PCT Pub. Date: Nov. 22, 2012

(65) Prior Publication Data
US 2014/0072443 A1    Mar. 13, 2014

(30) Foreign Application Priority Data

May 13, 2011 (FR) ...................... 11 54162

(51) Int. Cl.
*F01D 5/14* (2006.01)
*F01D 5/28* (2006.01)
*B29L 31/08* (2006.01)

(52) U.S. Cl.
CPC ............... *F01D 5/147* (2013.01); *F01D 5/282* (2013.01); *B29L 2031/08* (2013.01);
(Continued)

(58) Field of Classification Search
CPC .... F01D 5/147; F01D 5/282; F05D 2300/603; B29L 2031/08; Y02T 50/672; Y10T 29/49337
See application file for complete search history.

(56) References Cited

U.S. PATENT DOCUMENTS

| 4,022,547 A * | 5/1977 | Stanley | F01D 5/282 |
| | | | 416/230 |
| 4,051,289 A * | 9/1977 | Adamson | B29C 70/08 |
| | | | 156/227 |

(Continued)

FOREIGN PATENT DOCUMENTS

| FR | 1055160 A | 2/1954 |
| FR | 1055161 A | 2/1954 |

(Continued)

OTHER PUBLICATIONS

International Search Report for corresponding PCT Application No. PCT/FR2012/051047, mailed Aug. 1, 2012.

*Primary Examiner* — Igor Kershteyn
(74) *Attorney, Agent, or Firm* — Workman Nydegger (57) ABSTRACT

A turbine engine blade of composite material comprising fiber reinforcement obtained by multilayer weaving of yarns and densified by a matrix. The blade has a first portion constituting an airfoil forming a single piece with at least one second portion constituting a blade root. The fiber reinforcement portions corresponding to the first and second portions of the blade are mutually interleaved, at least in part, with yarns of the second fiber reinforcement portion penetrating into the first fiber reinforcement portion.

15 Claims, 5 Drawing Sheets

(52) U.S. Cl.
CPC ....... *F05D 2300/603* (2013.01); *Y02T 50/672* (2013.01); *Y10T 29/49337* (2015.01)

(56) References Cited

U.S. PATENT DOCUMENTS

| | | | |
|---|---|---|---|
| 5,375,978 A | 12/1994 | Evans et al. | |
| 6,041,132 A * | 3/2000 | Isaacs | G01N 23/046 378/21 |
| 6,413,051 B1 * | 7/2002 | Chou | B23P 6/005 416/229 A |
| 6,613,392 B2 * | 9/2003 | Baldwin | B29C 70/24 427/385.5 |
| 6,843,565 B2 * | 1/2005 | Evans | B29C 70/34 353/28 |
| 7,008,689 B2 * | 3/2006 | Hawkins | B32B 3/08 428/212 |
| 7,066,717 B2 * | 6/2006 | Morrison | F01D 5/187 29/889.71 |
| 7,575,417 B2 * | 8/2009 | Finn | F01D 5/147 416/230 |
| 7,926,761 B2 | 4/2011 | Coupe et al. | |
| 8,137,073 B2 * | 3/2012 | Giusti | F01D 5/147 416/224 |
| 2007/0007386 A1 | 1/2007 | Coupe et al. | |
| 2010/0144227 A1 | 6/2010 | Coupe et al. | |
| 2011/0311368 A1 | 12/2011 | Coupe et al. | |
| 2012/0055609 A1 | 3/2012 | Blanchard et al. | |

FOREIGN PATENT DOCUMENTS

| | | |
|---|---|---|
| FR | 2939129 A1 | 6/2010 |
| WO | 2006136755 A2 | 12/2006 |
| WO | 2010061140 A1 | 6/2010 |
| WO | 2010116066 A1 | 10/2010 |

* cited by examiner

COMPOSITE TURBOMACHINE BLADE WITH IN-BUILT ROOT

BACKGROUND OF THE INVENTION

The invention relates to turbine engine blades made of composite material comprising fiber reinforcement densified with a matrix.

The intended field is that of gas turbine blades for aeroengines or for industrial turbines.

Proposals have already been made for fabricating turbine engine blades out of composite material. Reference may be made in particular to international patent application WO 2010/061140 filed jointly by Snecma and Snecma Propulsion Solide. That application describes fabricating a turbine engine blade out of composite material comprising fiber reinforcement densified by a matrix. More precisely, that method presents the feature of the fiber blank made by multilayer weaving incorporating two textures that cross each other so that, after shaping, they form a one-piece fiber preform having a first portion forming a preform for an airfoil and a blade root, and at least one second portion forming a preform for an inner platform or an outer platform of the blade. Thus, after the preform has been densified, it is possible to obtain a composite material blade having fiber reinforcement constituted by the preform and densified by the matrix, and forming a single piece having an inner and/or an outer platform incorporated therein.

Under such circumstances, the blade root preform is made by using an insert so as to form a bulb-shaped region in the portion of the blade corresponding to its root.

Nevertheless, that technique for forming the blade root makes industrial fabrication of the blade more complex and increases fabrication costs because it gives rise to large losses of material and requires handling that is difficult and that slows down the speed of production.

OBJECT AND SUMMARY OF THE INVENTION

It is therefore desirable to be able to have turbine engine blades made out of composite material, particularly but not necessarily out of thermostructural composite material such as ceramic matrix composite (CMC) material, for the turbines or compressors of turbine engines, which blades are relatively simple to fabricate and present very good mechanical strength.

To this end, the present invention provides a method of fabricating a turbine engine blade out of composite material comprising fiber reinforcement densified by a matrix, the method comprising:

making a fiber blank by multilayer weaving a single piece comprising, in the longitudinal direction of said fiber blank corresponding to the longitudinal direction of the blade to be fabricated: a first set of a plurality of yarn layers that are interlinked to form a first portion of the blank corresponding to an airfoil preform; and a second set of one or more yarn layers that are interlinked at least locally to form at least a second portion of the blank corresponding to a blade root preform; the yarns of the first set of yarn layers not being interlinked with the yarns of the second set of yarn layers, the first set of yarn layers having the yarns of the second set of yarn layers crossing therethrough in the second portion of the blank;

shaping the fiber blank to obtain a one-piece fiber preform having said first portion forming an airfoil preform and at least said second portion forming a blade root preform; and densifying the preform with a matrix in order to obtain a composite material blade having fiber reinforcement constituted by the preform and densified by the matrix, forming a single piece incorporating a blade root.

Compared with prior art methods, the invention provides for making a blade root that is incorporated in the structure of the blade airfoil by crossing two yarn layer sets in the fiber blank in the portion thereof that is to form the blade root. It is thus possible to create a thicker zone in the fiber blank and to have a reserve of material that is sufficient for forming a blade root preform, thus making it possible to avoid using an insert as in the prior art.

In addition, the yarns of the fiber reinforcement portion for the blade root, which is the portion of the blade that is subjected to the greatest mechanical forces, acting mainly via the side portions of the root that project on either side of the blade and that serve to retain the blade root in its housing against centrifugal forces, cross the yarns of the other fiber reinforcement portion that constitutes the airfoil of the blade. By crossing the textures in this way, very good mechanical strength is obtained at the point where the blade is subjected to the greatest mechanical strength.

Away from this crossing, arranging zones of non-interlinking between the first and second yarn layer sets enables the fiber preform to be shaped without cutting any interlinking yarns, where any such cutting could result in a reduction in the mechanical strength of the fiber reinforcement and thus of the fabricated blade.

According to another feature of the method, the fiber blank is woven with a second continuous set of yarn layers, and the shaping of the fiber blank comprises eliminating portions of the second set of yarn layers outside the second portion of the fiber blank by cutting them off.

According to yet another feature of the method, it includes machining said second portion to the shape of the blade root that is to be made, the machining being performed after densifying the preform. In a variant implementation of the method, the preform is densified in two successive steps. Under such circumstances, a first machining step may be performed after the first densification step, and machining may be finished off by a second machining step performed after the second densification step.

According to another feature of the method of the invention, the fiber blank also includes at least one third portion forming some or all of the following elements:

an inner platform with or without overhangs and with or without an anti-tilting rim; and an outer platform with or without outer platform overhangs and with or without outer platform wipers;

the shaping of the fiber blank comprising shaping the third portion of the fiber blank to obtain a single piece fiber preform also having said third portion, the blade obtained after densification of the preform with a matrix forming a single piece that incorporates a blade root and that incorporates some or all of an element selected from the following elements:

an inner platform with or without overhangs and with or without an anti-tilting rim; and an outer platform with or without outer platform overhangs and with or without outer platform wipers.

The third portion may be formed by the second set of a plurality of yarn layers, the first set of yarn layers having yarns of the second set of yarn layers crossing therethrough once more in the third portion of the blank.

According to another feature of the present method, the number of yarn layers in the second set of yarn layers is greater in the second portion of the fiber blank than in the third portion.

According to yet another feature of the present method, the weight of the yarns in the second set of yarn layers is greater in the second portion of the fiber blank than in the third portion.

In a variant, the third portion corresponds to a fiber texture fitted onto the first portion of the fiber blank.

The invention also provides a turbine engine blade made of composite material comprising fiber reinforcement obtained by multilayer weaving of yarns and densified by a matrix, the blade comprising a first portion constituting an airfoil formed as a single piece with at least one second portion constituting a blade root, the fiber reinforcement portions corresponding to the first and second blade portions being mutually interleaved, at least in part, with the yarns of the first fiber reinforcement portion penetrating into the second fiber reinforcement portion.

According to a particular aspect of the blade, it further comprises at least one third portion forming some or all of the following elements:

an inner platform with or without overhangs and with or without an anti-tilting rim; and an outer platform with or without outer platform overhangs and with or without outer platform wipers.

According to a feature of the blade, the fiber reinforcement portions corresponding to the first and third portions of the blade are mutually interleaved, at least in part, with yarns of the first fiber reinforcement portion penetrating into the second fiber reinforcement portion.

The blade may be made of ceramic matrix composite material.

The invention also provides a compressor rotor or disk fitted with a plurality of blades as defined above. The invention also provides a compressor fitted with such a rotor and a turbine engine including such a compressor.

BRIEF DESCRIPTION OF THE DRAWINGS

The invention can be better understood from the following description given by way of non-limiting indication and with reference to the accompanying drawings, in which.

DETAILED DESCRIPTION OF EMBODIMENTS

The invention is applicable to various types of turbine engine blade that, in accordance with the invention, comprise at least one root incorporated with the airfoil structure. The blades in question are in particular compressor and turbine blades for various gas turbine spools and they may also incorporate other elements such as, in particular, an inner platform possibly provided with an anti-tilting rim and/or overhang, or an outer platform possibly provided with overhangs and/or wipers. Nevertheless, the invention also applies to incorporated-root blades where one or more of these elements are added during the making of the fiber preform for the blade, i.e. prior to densification or after densification.

Figure 1:
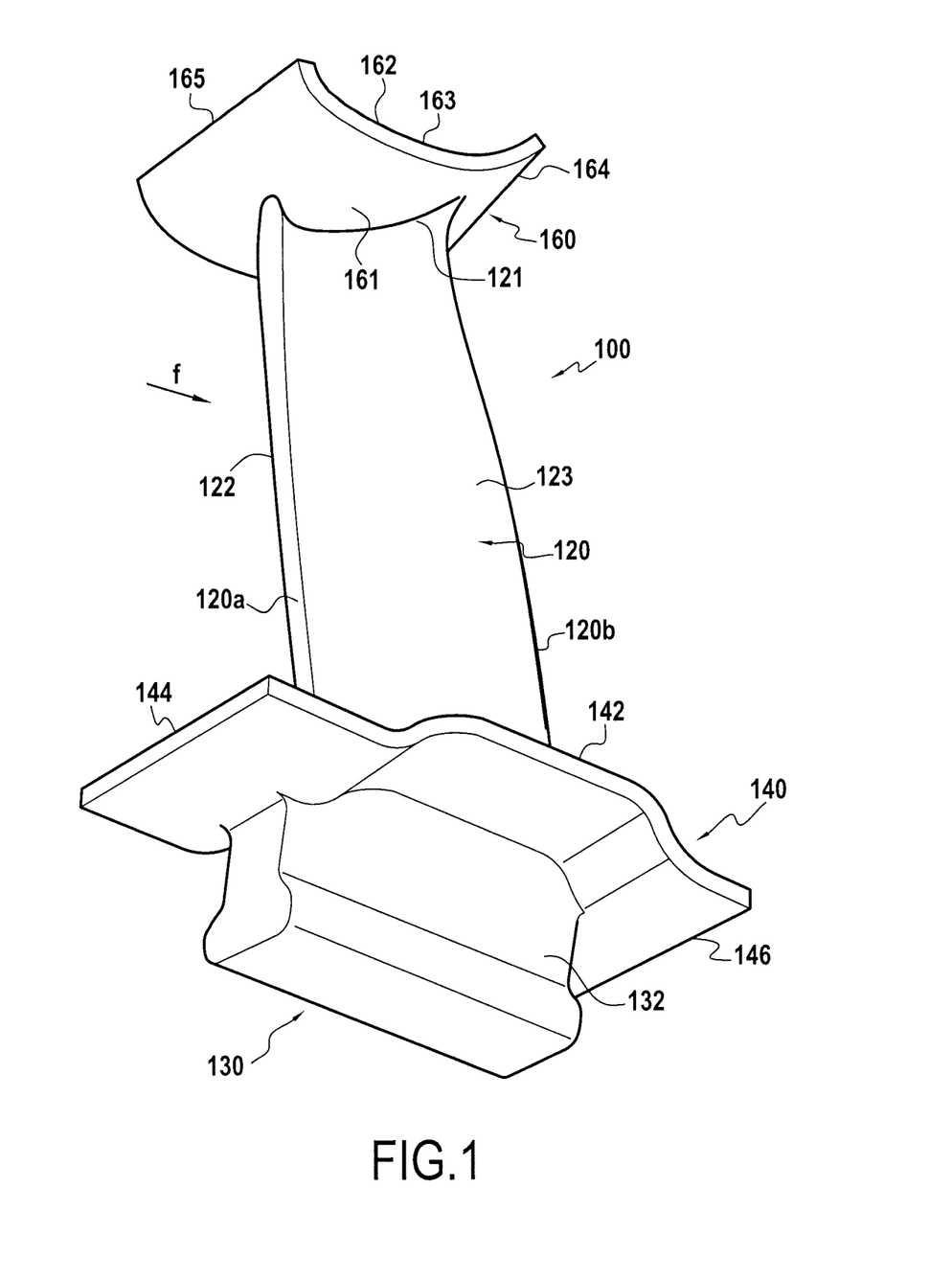
FIG. 1 is a perspective view of a rotor wheel blade in an embodiment of the invention.

FIG. 1 shows a blade 100 for a low pressure (LP) turbine rotor wheel that comprises an airfoil 120 and a root 130 formed by a portion of greater thickness, e.g. having a bulb-shaped section, and extended by a tang 132. The blade 120 extends in a longitudinal direction between its root 130 and its tip 121 and in cross-section it presents a curved profile of varying thickness defining two faces 122 and 123, corresponding respectively to the suction side and to the pressure side of the blade 120, and each interconnecting the leading edge 120a and the trailing edge 120b of the blade.

The blade 120 is mounted on a turbine rotor (not shown) by engaging the root 130 in a housing of complementary shape formed at the periphery of the rotor.

In the presently-described example, the airfoil 120 also has an inner platform 140 and an outer platform 160.

More precisely, at its radially inner end, the airfoil 120 is connected to the inner platform 140 having its outer (or top) face 142 defining the flow passage of a gas stream f, radially on the inside. In its end portions that are upstream and downstream (in the flow direction of the gas stream f), the inner platform 140 is terminated by covering overhangs 144 and 146.

In the example shown, the face 142 of the platform is substantially perpendicular to the longitudinal direction of the blade. Depending on the profile desired for the inside surface of the flow passage for the gas stream, the face 142 of the platform could equally well be inclined so as to form overall a non-zero angle relative to the normal to the longitudinal direction of the blade, and/or the face 142 may have a profile that is generally not rectilinear, e.g. a profile that is curved.

The airfoil 120 is also connected at its radially outer end to an outer platform 160 that defines on its inside (bottom) face 161 the flow passage for the gas stream f, radially on the outside. On its outer (top) face 162, the outer platform 160 defines a depression or bathtub 163. Along the upstream and downstream edges of the bathtub 163, the outer platform 160 carrying wipers 164 and 165 having a profile in the form of teeth with ends suitable for penetrating into a layer of abradable material on a turbine ring (not shown) for the purpose of reducing clearance between the blade tip and the turbine ring. In the example shown, the face 161 of the outer platform 60 presents a curved profile forming overall a non-zero angle relative to the normal to the longitudinal direction of the blade. In a variant, depending on the profile desired for the outer surface of the gas stream flow passage, the face 161 could have a profile that is generally rectilinear and/or that extends substantially perpendicularly to the longitudinal direction of the blade.

Figure 2:
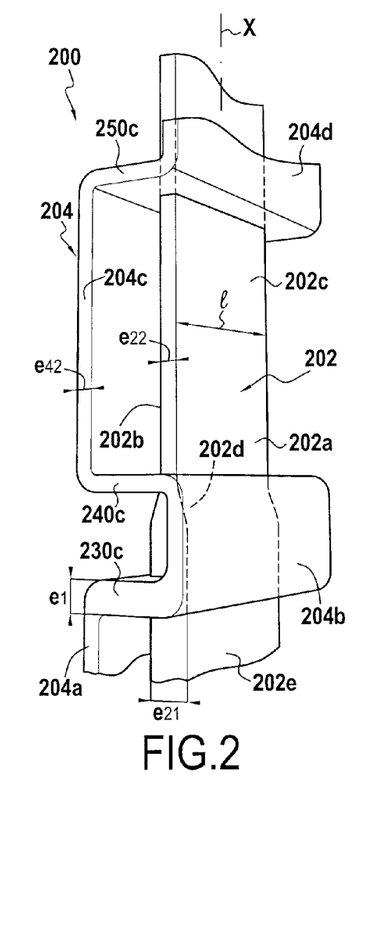
FIG. 2 is a highly diagrammatic view of the arrangement of two sets of yarn layers in a multilayer woven fiber blank for making a fiber preform for a blade of the kind shown in FIG. 1.

FIG. 2 is a highly diagrammatic view of a fiber blank 200 from which a blade fiber preform can be shaped so that after being densified with a matrix and possibly after being machined, a composite material blade is obtained having a root, an inner platform, and an outer platform that are all incorporated therein, such as the blade 100 shown in FIG. 1.

The blank 200 comprises two fiber strips 202 and 204 that are obtained by three-dimensional weaving or multilayer weaving, and only the geometrical envelopes of these two portions are shown in FIG. 2. For greater clarity in FIG. 2, the strips 202 and 204 are shown as being spaced apart from each other. Nevertheless, in reality, the strip 204 is woven as close as possible to the strip 202.

The fiber strip 202 has a first portion 202c that, after shaping, is to constitute a blade fiber preform portion corresponding to an airfoil preform, this portion presenting a face 202a that is to form the pressure side of the airfoil and a face 202b that is to form the suction side of the airfoil. The strip 202 also has a third portion 202e of greater thickness that is to constitute a blade root preform portion and that is connected to the first portion 202c by a second portion 202d of tapering thickness that is to constitute a blade tang preform.

After being shaped, the fiber strip 204 is to constitute those portions of the blade fiber preform that correspond to preforms for the root, for the inner platform and for the outer platform (including their overhang plates) of the blade.

The two strips 202 and 204 extend generally in a direction X corresponding to the longitudinal direction of the blade that is to be made. In its thicker portion 202e that is to form a blade root preform, the fiber strip 202 presents thickness e21, e.g. in the range about 5 millimeters (mm) to 6 mm, and in its portion 202c that is to form an airfoil preform it presents a thickness e22 that is less than the thickness e21, e.g. about 3 mm on average. The thickness e22 may vary along the length of the portion that is to form an airfoil preform as a function of the thickness of the airfoil profile of the blade that is to be made.

In its portion that is to form a blade root preform portion corresponding to the connection portion 230c as described below, the fiber strip 204 presents a thickness e41, e.g. lying in the range about 4 mm to 5 mm, and in its other portions corresponding in particular to the connection portions 240c and 250c described below, it presents a thickness e42 that is less than the thickness e41, e.g. of about 3 mm.

The fiber strip 202 presents a width l that is selected as a function of the developed length of the profile (i.e. its length when flat) of the airfoil of the blade to be made, while the fiber strip 204 has a width L greater than l that is selected as a function of the developed lengths of the inner platform and of the outer platform of the blade to be made.

The strip 204 has a first portion 204a and a third portion 204c that extend along and beside the second face 202b (suction side) of the strip 202, and a second portion 204b and a fourth portion 204d that extend along and beside the first face 202a (pressure side) of the strip 202.

The portions 204a and 204b are connected together by a connection portion 230c that extends transversely through the strip 202 at a location corresponding to the location of the root of the blade to be made. The connection portion 230c passes through the strip substantially perpendicularly to the longitudinal direction of the fiber blank.

The portions 204b and 204c are connected together by a connection portion 240c that extends transversely through the strip 202 at a location corresponding to the location of the inner platform of the blade to be made. The connection portion 240c passes through the strips substantially perpendicularly to the longitudinal direction of the fiber blank.

The portions 204c and 204d are connected together by a connection portion 250c that extends transversely through the strip 202 with an undulating profile at a location corresponding to the location of the outer platform of the blade to be made.

As mentioned above, depending on the shapes desired for the root, the inner platform, and the outer platform of the blade, one or more connection portions 230c, 240c, and 250c may pass through the strip 202 perpendicularly or at a non-zero angle relative to the normal to the longitudinal direction X of the blank, and/or may present a profile that is rectilinear or curvilinear.

As described in greater detail below, the strips 202 and 204 are woven simultaneously by multilayer weaving, without interlinking between the strip 202 and the portions 204a, 204b, 204c, and 204d of the strip 204, with a plurality of blades 200 being woven continuously in succession in the direction X.

The extra thicknesses e21 and e41 respectively in the strips 202 and 204 may be obtained in particular by using yarns of greater weight in these zones and/or by increasing the number of weft or warp yarn layers in these zones.

Figure 3:
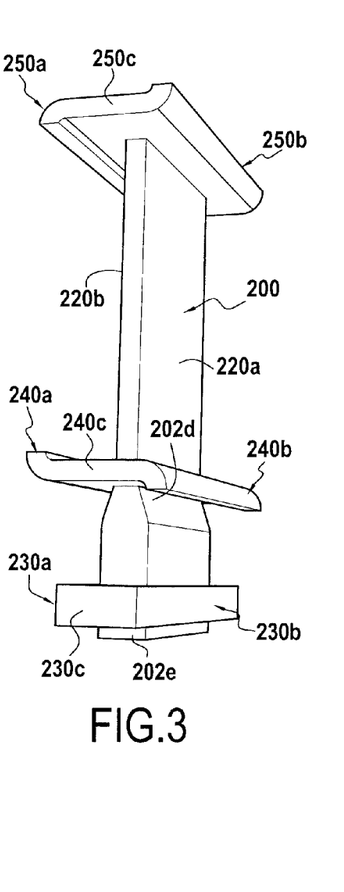
FIGS. 3 to 5 show successive steps in making a fiber preform for a blade as shown in FIG. 1, from the fiber blank of FIG. 2.
Figure 4:
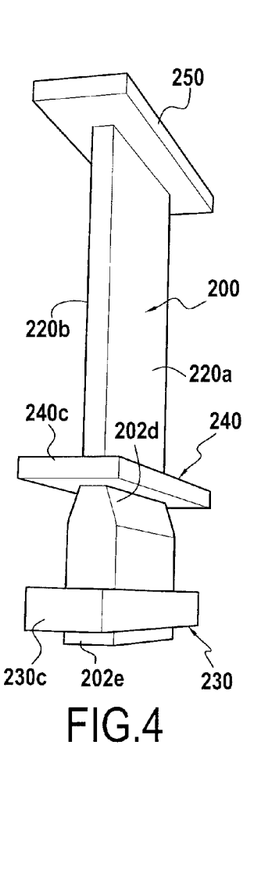
Figure 5:
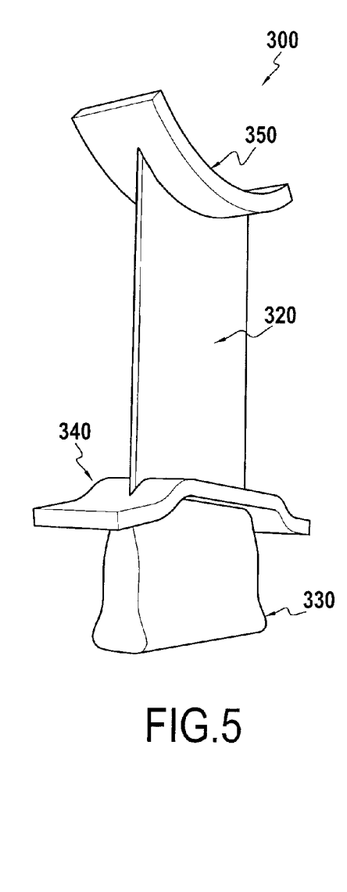

FIGS. 3 to 5 are highly diagrammatic and they show how a fiber preform of shape close to that of the blade that is to be fabricated can be obtained from the fiber blank 200.

The fiber strip 202 is cut through at one end of its thicker portion 202e beneath the connection portion 230c, and at another end a little beyond the connection portion 250c so as to have a strip 220 of length corresponding to the longitudinal dimension of the blade that is to be fabricated with an enlarged portion 230 formed by a thicker portion 202e and situated at a location corresponding to the position of the root of the blade to be fabricated. The strip 220 presents a face 220a for forming the pressure side of the airfoil and a face 220b for forming the suction side of the airfoil.

Furthermore, cuts are made at the ends of the portions 204a and 204d of the strip 204 and in the portions 204b and 204c thereof in order to leave segments 230a and 230b on either side of the connection portion 230c, segments 240a and 240b on either side of the connection portion 240c, and segments 250a and 250b on either side of the connection portion 250c, as shown in FIG. 3. The lengths of the segments 230a, 230b, 240a, 240b, 250a, and 250b are determined as a function of the width of the root, the inner platform, and the outer platform of the blade to be fabricated.

Because there is no interlinking between the strip 202 of the fiber preform and any of the portions 204a, 204b, 204c, and 204d, the segments 230a, 230b, 240a, 240b, 250a, and 250b can be folded perpendicularly to the strip 220 without cutting yarns in order to form plates 230, 240, and 250 as shown in FIG. 4.

A fiber preform 300 for the blade that is to be fabricated is then obtained by molding and deforming the strip 220 so as to reproduce the curved profile of the blade airfoil and deforming the plates 240 and 250 so as to reproduce shapes that are similar respectively to the shape of the inner platform and to the shape of the outer platform, as shown in FIG. 5. After densification, the preform 300 is machined to give the plate 230 a shape similar to the shape of the root of the blade to be made. This produces a preform 300 with an airfoil preform portion 320, a root preform portion 330 (including a tang preform portion), and preform portions 340 and 350 for the inner platform and for the outer platform.

The fiber blank 200 is woven using warp yarns that extend in the longitudinal direction X of the blank, it being observed that it is also possible to perform weaving with weft yarns extending in this direction.

In an embodiment, the yarns used may be yarns of silicon carbide (SiC) provided under the name "Nicalon" by the Japanese supplier Nippon Carbon and having a weight (expressed as a number of filaments) of 0.5 K (i.e. 500 filaments).

Naturally, depending on available yarn weights, different combinations of yarn layer numbers and variations of thread count and of weight may be adopted for the profile that is to be obtained.

By way of example, the weaving of the fiber blank 200 may be multilayer weaving performed using a satin or a multi-satin type weave. It is also possible to other types of multilayer weaving, e.g. multilayer weaving with a multi-plain weave or weaving with an "interlock" weave. The term "interlock" is used herein to mean a weave in which each layer of weft yarns links together a plurality of layers of warp yarns, with all of the yarns in a given weft column having the same movement in the weave plane.

Various ways of performing multilayer weaving are described in particular in Document WO 2006/136755.

Figure 6A:
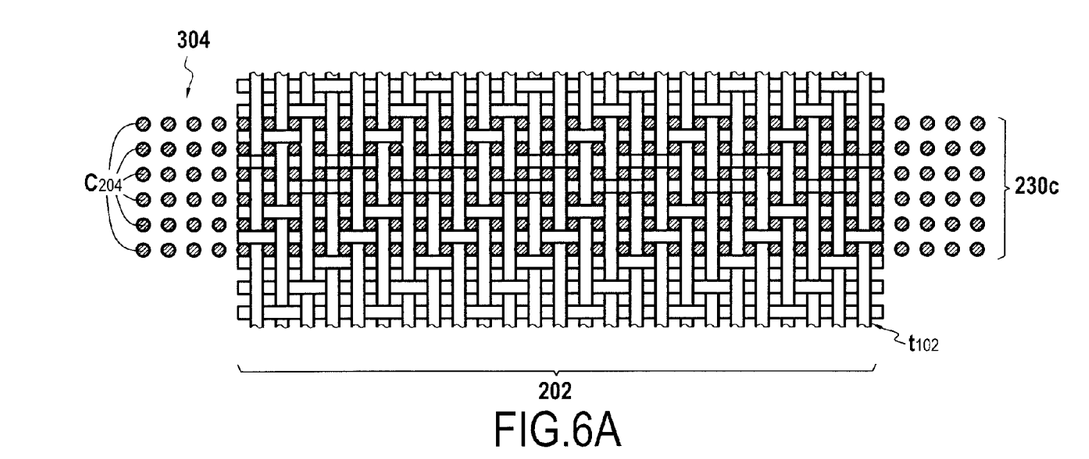
FIG. 6A is a fragmentary warp section view in a portion of the FIG. 2 fiber blank corresponding to the location of the junction between the airfoil and the root of the blade.

FIG. 6A is a warp section view through the portion of the strip 202 where it is crossed by the connection portion 230c of the strip 204 of the FIG. 2 fiber blank, the warp yarns of this connection portion being shown in section. Each warp yarn layer C204 of the strip 204 extends in this connection portion 230c in a connection perpendicular to the weft direction t202 of the strip 202. During weaving, the strip 204 is passed from one side to the other of the strip 202 by causing all of the warp and weft yarns of the strip 204 to be crossed by each warp yarn of the strip 204 individually.

Figure 6B:
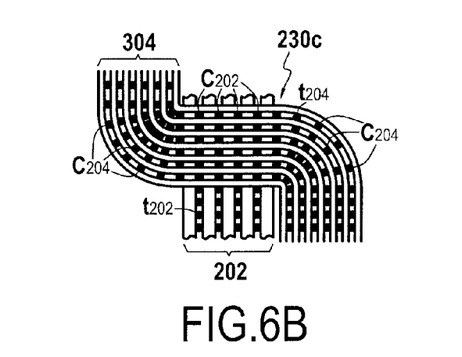
FIG. 6B is a fragmentary weft section in the portion of the FIG. 2 fiber blank corresponding to the location of the junction between the airfoil and the root of the blade.

FIG. 6B is a weft section view of the weft yarns t202 and t204 respectively of the strips 202 and 204 where the strip 202 is crossed by the connection portion 230c of the strip 204 of the FIG. 2 fiber blank. In the example shown, and as mentioned above, the connection portion 230c extends perpendicularly to the direction of the warp yarn layers C202 of the strip 202.

The warp and weft section views where the strip 202 is crossed by the connection portion 240c of the strip 204 in the FIG. 2 fiber blank are similar to those shown in FIGS. 6A and 6B, but with a smaller number of warp layers C202 and C204 respectively in the strips 202 and 204 because of the thickness differences in the strips 202 and 204 between the connection portion 230c and the connection portion 240c.

Figure 7A:
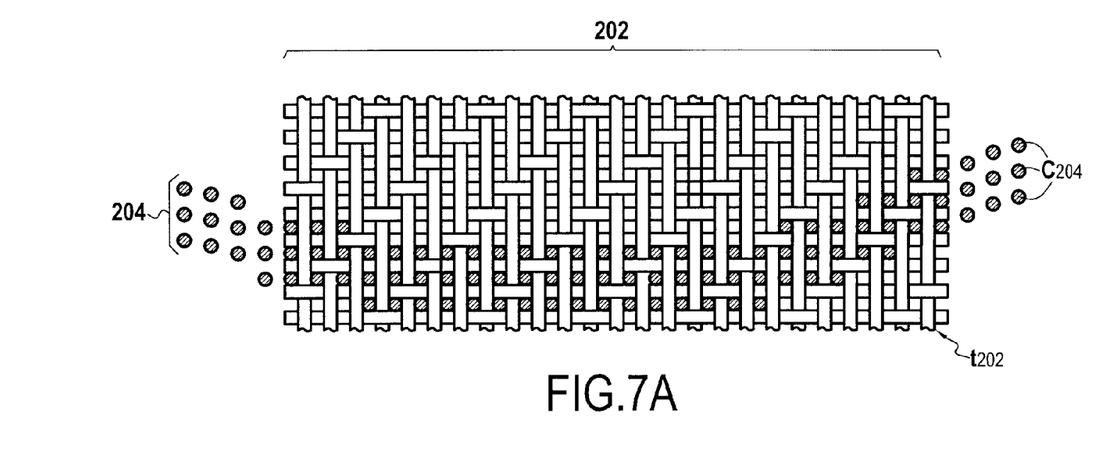
FIG. 7A is a fragmentary warp section view in a portion of the FIG. 2 fiber blank corresponding to the location of the junction between the airfoil and the outer platform of the blade.

FIG. 7A is a warp section view where the strip 202 is crossed by the connection portion 250c of the strip 204 of the FIG. 2 fiber blank. In this portion, the warp yarn layers C204 of the strip 204 penetrate between the weft yarns t202 of the strip 202 following a curved profile as shown in FIG. 7A. Naturally, depending on the shape desired for the outer platform, the layers of warp yarn C204 of the strip 204 may enter and leave the strip 202 with profiles of other shapes, e.g. profiles that are rectilinear.

Figure 7B:
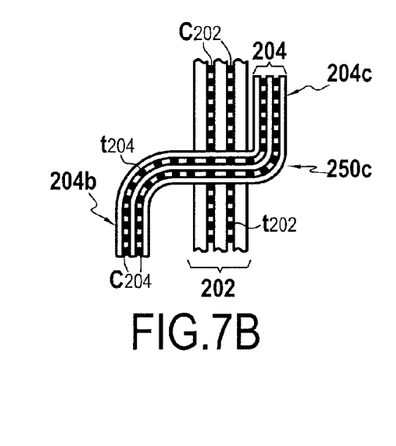
FIG. 7B is a fragmentary weft section in the portion of the FIG. 2 fiber blank corresponding to the location of the junction between the airfoil and the outer platform of the blade.

FIG. 7B is a weft section view of the weft yarns t202 and t204 respectively of the strips 202 and 204 where the strip 202 is crossed by the connection portion 250c of the strip 204. In the example shown, and as mentioned above, the connection portion 250c extends perpendicularly to the direction of the warp yarn layers C202 of the strip 202.

Figure 8A:
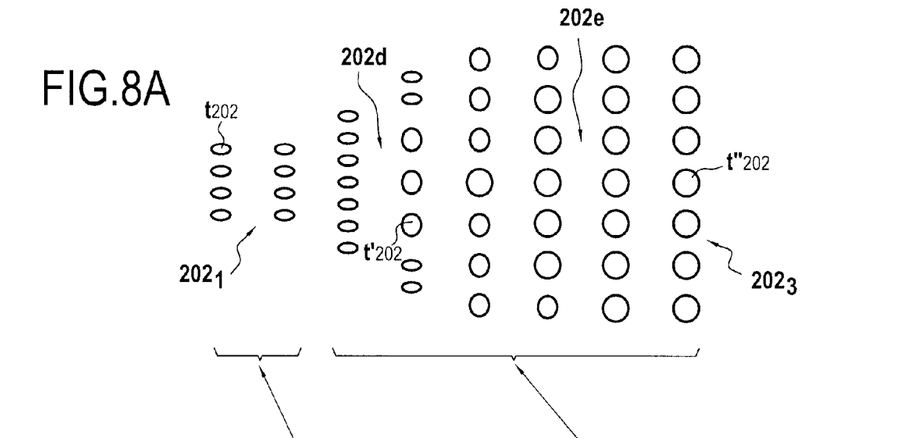
FIG. 8A is a weft section view showing an example weft yarn arrangement in a portion of the fiber blank corresponding to a blade root portion.

The thicker portion 202e of the fiber strip 202 and the extra thickness present in the connection portion 230c of the strip 204 may be obtained by using weft yarns of greater weight and by using extra layers of weft yarns, as shown for example in FIG. 8A for the thicker portion 202e.

In FIG. 8A, the number of weft yarn layers in this example goes from four to seven between a portion $202_1$ corresponding to the portion 202d of decreasing thickness that is to constitute a blade tang preform and a portion $202_3$ corresponding to the thicker portion 202e of the strip 202 that is to form a blade root preform portion.

In addition, weft yarns t202, t'202, and t"202 of different weights are used, the yarns t202 being Nicalon SiC yarns of weight 0.5 K (500 filaments), the yarns t'202 being obtained by uniting two 0.5 K yarns, and the yarns t"202 being obtained by uniting three 0.5 K yarns.

Figure 8B:
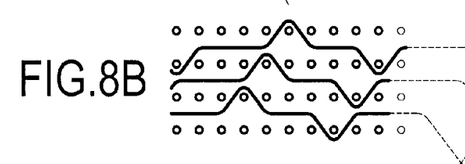
FIGS. 8B to 8D are weft section views showing warp planes for one example of multilayer weaving in the fiber blank portion of FIG. 8A.
Figure 8C:
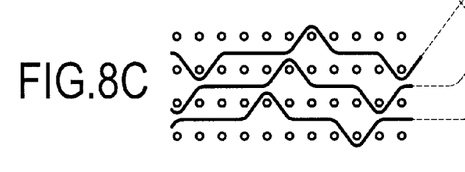
Figure 8D:
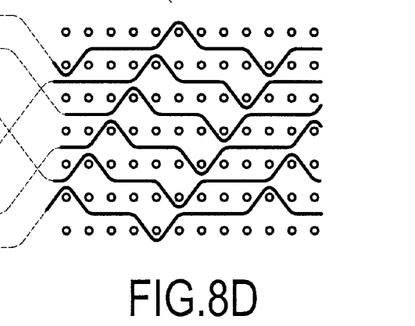

The weaving in the portion $202_3$ of the blank requires a greater number of warp yarns than in the portion $202_1$. This is advantageously obtained at the transition between the portions $202_1$ and $202_3$ by reducing the number of warp planes by making up each warp plane in the portion $202_3$ by uniting warp yarns from two warp planes in the portion $202_1$. FIGS. 8B and 8C show two adjacent warp planes in the portion $202_1$, and FIG. 8D shows a single warp plane obtained in the portion $202_3$ by uniting the warp planes of FIGS. 8B and 8C. FIGS. 8B, 8C, and 8D do not show the different weights of the warp yarns or of the weft yarns (as shown in FIG. 8A) for simplification purposes. Between FIGS. 8B and 8C on one side and FIG. 8D on the other, dashed lines show how the warp yarns of the various layers in FIGS. 8B and 8C form the warp yarns of the layers in FIG. 8D.

Naturally, it is possible to adopt other combinations of warp layer numbers and of weft yarn weights in order to form the extra thicknesses present in the portion 202e of the fiber strip 202 and in the connection portion 230c of the strip 204.

There follows a description of the successive steps that may be performed in order to shape the fiber preform of an outer platform element or of a blade of the invention, and the densification of the preform.

As described above, a fiber blank for forming the fiber reinforcement of an outer platform element or of a blade is woven by multilayer weaving, or by stacking fiber structures. For turbine engine blades that are for use at high temperature and in particular in a corrosive environment (in particular a wet environment), the yarns used for the weaving are made of ceramic fibers, and in particular of fibers made of silicon carbide (SiC). For lower temperatures, it is also possible to use carbon fibers.

Densification of the fiber preform that is to form the fiber reinforcement of the part that is to be fabricated involves using the material that is to constitute the matrix to fill in the pores of the preform, throughout all or part of its volume. This densification may be performed in known manner using a liquid technique (CVL) or the gas technique of chemical vapor infiltration (CVI), or indeed by chaining both of those methods.

The liquid technique consists in impregnating the preform with a liquid composition containing a precursor for the matrix material. The precursor is usually in the form of a polymer such as a resin, possibly diluted in a solvent. The preform is placed in a mold that may be closed in leaktight manner with a cavity having the final shape for the molded part. Thereafter, the mold is closed and the liquid matrix precursor (e.g. a resin) is injected throughout the cavity in order to impregnate all of the fiber portion of the preform.

The precursor is transformed into a matrix, i.e. it is polymerized, by heat treatment, generally by heating the mold after any solvent has been eliminated and after the polymer has been cured, the preform being maintained at all times in the mold having the shape that corresponds to the shape of the part that is to be made.

When forming a matrix of carbon or of ceramic, the heat treatment consists in pyrolyzing the precursor in order to transform the matrix into a matrix of carbon or of ceramic depending on the precursor used and depending on pyrolysis conditions. By way of example, liquid precursors for ceramic, in particular for SiC, may be resins of the following types: polycarbosilane (PCS); or polytitanocarbosilane (PTCS); or polysilazane (PSZ) type; whereas liquid precursors for carbon may be resins having a relatively high coke content, such as phenolic resins. Several cycles running from impregnation to heat treatment may be performed consecutively in order to reach the desired degree of densification.

In an aspect of the invention, in particular when forming an organic matrix, the fiber preform may be densified by the well-known resin transfer molding (RTM) method. In the RTM method, the fiber preform is placed in a mold having the outside shape of the part that is to be made. A thermosetting resin is injected into the inside space of the mold, which contains the fiber preform. A pressure gradient is generally established in said inside space between the location where the resin is injected and orifices for exhausting said space so as to control and optimize impregnation of the preform with the resin.

In known manner, the fiber preform may also be densified using a gas technique by chemical vapor infiltration (CVI) of the matrix. The fiber preform corresponding to the structure to be made is placed in an oven into which a reaction gas is admitted. The pressure and the temperature that exist in the oven and the composition of the gas are selected so as to enable the gas to diffuse within the pores of the preform so as to form the matrix in the core of the material by depositing solid material in contact with the fibers, the material resulting from decomposing an ingredient of the gas or from a reaction between a plurality of ingredients, as contrasted with the pressure and temperature conditions that are suitable for chemical vapor deposition (CVD) methods that lead to deposition only on the surface of the material.

An SiC matrix may be formed using methyltrichlorosilane (MTS) that gives SiC by the MTS decomposing, whereas a carbon matrix may be obtained with hydrocarbon gases such as methane and/or propane that give carbon by cracking.

Densification combining a liquid technique and a gas technique may also be used in order to facilitate operations, limit costs, and limit fabrication cycles, while obtaining characteristics that are satisfactory for the intended use.

In particular, the matrix may be obtained using epoxy resins, e.g. such as high-performance epoxy resin, or by using liquid precursors for carbon or ceramic matrices.

In the presently-described example, the fiber blank is impregnated by a consolidation composition, typically a resin that is optionally diluted in a solvent. It is possible to use a carbon precursor resin, e.g. a phenolic or a furanic resin, or a ceramic precursor resin, e.g. a polysilazane or a polyoxysiloxane resin that is a precursor for SiC.

After drying to eliminate any solvent from the resin, it is possible to pre-cure the resin. Pre-curing, or incomplete curing, serves to increase stiffness and thus strength while preserving the capacity for deformation that is necessary for making a preform of an outer platform element or of a blade.

The fiber blank, in particular the blank for forming the blade, is cut in a manner shown in FIG. 3.

Thereafter, the blank is shaped (as shown in FIG. 5) and placed in a mold, e.g. made of graphite, in order to shape the overhang and wiper plates of the outer platform when making an outer platform element and the inner platform portion, the root portion, and the airfoil portion when making the blade.

Thereafter, the resin is cured completely and the cured resin is pyrolized. Curing and pyrolysis may be run on one after the other by progressively raising the temperature inside the mold.

After pyrolysis, a fiber preform is obtained that is consolidated with the pyrolysis residue. The quantity of consolidation resin is selected so that the pyrolysis residue binds the fibers of the preform together sufficiently to enable it to be manipulated while conserving its shape without help from tooling, it being understood that the quantity of consolidation resin is preferably selected to be as small as possible.

The consolidated preform is then densified with a matrix. For a turbine engine blade that is to be used at high temperature, and in particular in a corrosive atmosphere, the matrix is a ceramic matrix, e.g. made of SiC. Densification may be performed by CVI, in which case the formation of the interphase second layer and the densification of the matrix may be run on one after the other in the same oven.

Densification may be performed in two successive steps separated by a step of machining the outer platform element or the blade to the desired dimensions.

It should be observed that pre-machining may be performed after curing and prior to pyrolyzing the resin.

In a variant implementation, the preform may be consolidated by partial densification while being maintained in the shaper, consolidation being performed by depositing ceramic on the fibers by CVI.

The shaper is preferably made of graphite and presents holes for facilitating the passage of reaction gases leading to the interphase and the ceramic being deposited by CVI.

Once consolidation is sufficient to enable the preform to be manipulated while conserving its shape without the existence of supporting tooling, the consolidated preform is extracted from the shaper and densification with a ceramic matrix is performed by CVI. The densification may be performed in two successive steps separated by a step of machining the outer platform element or the blade to the desired dimensions.

In the description above, an airfoil profile of varying thickness is made by using yarns of varying weight and/or thread count. In a variant, it is possible to make the portion of the fiber blank that corresponds to the airfoil preform portion with a certain number of yarn layers having the same weight and constant thread counts, with the variation in the thickness of the profile being obtained during the machining operation after the first step of densification or during a pre-machining operation on the consolidated blade preform.

Depending on the intended conditions of use, it is also possible for the fibers of the fiber reinforcement of the blade to be made of a material other than a ceramic, e.g. to be made of carbon, and for the matrix to be made of a material other than a ceramic, e.g. to be made of carbon or of a resin. The blade of the invention may in particular be made out of a ceramic matrix composite (CMC) material, which is a material made up of reinforcement of carbon or ceramic fibers densified by a matrix that is made of ceramic at least in part, such as a carbon-carbon/silicon carbide (C—C/SiC) material, a carbon/silicon carbide (C/SiC) material, a silicon carbide/silicon carbide (SiC/SiC) material, or a carbon/carbon (C/C) composite material, which in known manner is a material made up of carbon fiber reinforcement densified with a carbon matrix.

Naturally, the invention is also applicable to fabricating blades out of organic matrix composite (OMC) material, for example such as the material obtained using a high performance epoxy resin.

The final shape of the blade root is machined after the preform has been densified. When densification is performed in two stages, coarse initial machining of the blade root preform is performed, while finer second machining to the final shape and dimensions of the blade root that is to be made is performed after the second stage of densifying the preform.

Figure 9:
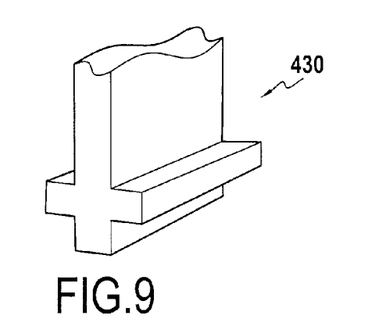
FIGS. 9 and 10 are highly diagrammatic views of variant embodiments of the blade root.
Figure 10:
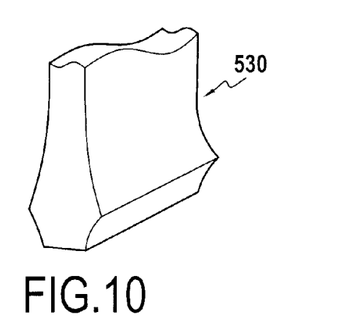

The shape of the blade root of the invention is not limited to a bulb shape as shown in FIG. 1. Depending on the shape of the rotor housing in which the blade root is to be engaged, and/or on the desired distribution of forces exerted on the blade root, the blade of the invention may present numerous other shapes, such as in particular a shape that is rectilinear or cruciform, like the root 430 of FIG. 9, or a shape that is substantially polygonal, like the root 530 of FIG. 10.

Furthermore, in the above-described blade, the fiber blank corresponds to a fiber structure that is woven as a single piece that incorporates not only a first portion for forming the airfoil of the blade, but also a second portion for forming the blade root in accordance with the invention together with third and fourth portions respectively for forming an inner platform and an outer platform, the second, third, and fourth portions each being interleaved at least in part with the first portion (at least the portion of the first portion being crossed by yarns of the second, third, and fourth portions).

Nevertheless, the blade of the invention is not limited to such a blade structure.

In general, the blade of the invention covers any type of blade having a first portion constituting an airfoil forming a single piece with at least one second portion forming a blade root, the fiber reinforcement portions corresponding to the first and second portions of the blade being mutually interleaved at least in part with the yarns of the second fiber reinforcement portion penetrating into the first fiber reinforcement portion, the blade possibly also including at least:

a third portion forming all or some of the following elements:

an inner platform with or without overhangs and with or without an anti-tilting rim;

an outer platform with or without overhangs and with or without wipers; and the fiber reinforcement portions corresponding to the first and to the third portions of the blade are mutually interleaved, at least in part, with the yarns of the third fiber reinforcement portion penetrating into the first fiber reinforcement portion as described in French patent applications Nos. 10/55160 and 10/55161;

a third portion forming some or all of the following elements:

an inner platform with or without overhangs and with or without an anti-tilting rim; an outer platform with or without overhangs and with or without wipers; and the fiber blank corresponding to the third portion being separate from the fiber blank corresponding to the first portion constituting the airfoil of the blade, and being fastened thereto, e.g. by stitching;

an inner platform element with or without overhangs and with or without an anti-tilting rim, the platform element being fabricated independently of the mutually interleaved first and second portions and subsequently being fitted onto the airfoil of the blade as described in international patent application WO 2010/116066; and an outer platform element with or without overhangs and with or without wipers, the outer platform element being fabricated independently of the first and second mutually interleaved portions, and subsequently being fitted on the blade airfoil as described in international patent application WO 2010/116066.

The invention claimed is:

1. A method of fabricating a turbine engine blade out of composite material comprising fiber reinforcement densified by a matrix, the method comprising:

making a fiber blank by multilayer weaving a single piece comprising, in the longitudinal direction of said fiber blank corresponding to the longitudinal direction of the blade to be fabricated: a first set of a plurality of yarn layers that are interlinked to form a first portion of the blank corresponding to an airfoil preform; and a second set of one or more yarn layers that are interlinked at least locally to form at least a second portion of the blank corresponding to a blade root preform; the yarns of the first set of yarn layers not being interlinked with the yarns of the second set of yarn layers, the first set of yarn layers having the yarns of the second set of yarn layers crossing therethrough in the second portion of the blank;

shaping the fiber blank to obtain a one-piece fiber preform having said first portion forming an airfoil preform and at least said second portion forming a blade root preform; and densifying the preform with a matrix in order to obtain a composite material blade having fiber reinforcement constituted by the preform and densified by the matrix, forming a single piece incorporating a blade root.

2. The method according to claim 1, wherein the fiber blank is woven with a second continuous set of yarn layers, and the shaping of the fiber blank comprises eliminating portions of the second set of yarn layers outside the second portion of the fiber blank by cutting them off.

3. The method according to claim 2, wherein it includes machining said second portion to the shape of the blade root that is to be made.

4. The method according to claim 1, wherein the fiber blank also includes at least one third portion forming some or all of the following elements:

an inner platform with or without overhangs and with or without an anti-tilting rim; and an outer platform with or without outer platform overhangs and with or without outer platform wipers; and in that shaping the fiber blank comprises shaping the third portion of the fiber blank to obtain a single piece fiber preform also having said third portion, the blade obtained after densification of the preform with a matrix forming a single piece that incorporates a blade root and that incorporates some or all of an element selected from the following elements:

an inner platform with or without overhangs and with or without an anti-tilting rim; and an outer platform with or without outer platform overhangs and with or without outer platform wipers.

5. The method according to claim 4, wherein the third portion is formed by said second set of a plurality of yarn layers, the first set of yarn layers having yarns of the second set of yarn layers crossing therethrough in the third portion of the blank.

6. The method according to claim 4, wherein the fiber blank is woven with the continuous second set of yarn layers, and the shaping of the fiber blade comprises eliminating portions of the second set of yarn layers outside the third portion of the fiber blank, by cutting them off.

7. The method according to claim 4, wherein the number of yarn layers in the second set of yarn layers is greater in the second portion of the fiber blank than in the third portion.

8. The method according to claim 4, wherein the weight of the yarns in the second set of yarn layers is greater in the second portion of the fiber blank than in the third portion.

9. The method according to claim 4, wherein the third portion corresponds to a fiber texture fitted onto the first portion of the fiber blank.

10. A turbine engine blade made of composite material comprising fiber reinforcement obtained by multilayer weaving of yarns and densified by a matrix; wherein it comprises a first portion constituting an airfoil formed as a single piece with at least one second portion constituting a blade root, the first portion constituting an airfoil comprising a first set of a plurality of yarn layers that are interlinked to form a first portion of the fiber reinforcement of the blade, the second portion constituting a blade root comprising a second set of one or more yarn layers that are interlinked at least locally to form a second portion of the fiber reinforcement of the blade, the yarns of the first set of yarn layers not being interlinked with the yarns of the second set of the yarn layers, the first set of yarn layers having the yarns of the second set of yarn layers crossing therethrough in the second portion of the fiber reinforcement of the blade.

11. The blade according to claim 10, wherein it further comprises at least one third portion forming some or all of the following elements:
   an inner platform with or without overhangs and with or without an anti-tilting rim; and
   an outer platform with or without outer platform overhangs and with or without outer platform wipers.

12. The blade according to claim 11, wherein the fiber reinforcement portions corresponding to the first and third portions of the blade are mutually interleaved, at least in part, with yarns of the first fiber reinforcement portion penetrating into the second fiber reinforcement portion.

13. A rotor having one or more blades according to claim 10.

14. A compressor fitted with a rotor according to claim 13.

15. A turbine engine fitted with a compressor according to claim 14.

* * * * *